United States Patent [19]

Fowler

[11] Patent Number: 5,235,755
[45] Date of Patent: Aug. 17, 1993

[54] ANGLE FINDING DEVICE

[76] Inventor: David A. Fowler, Church Lane, Colston Bassett, Nottingham, United Kingdom, NG12 3FE

[21] Appl. No.: 777,261
[22] PCT Filed: May 29, 1990
[86] PCT No.: PCT/GB90/00831
§ 371 Date: Dec. 2, 1991
§ 102(e) Date: Dec. 2, 1991
[87] PCT Pub. No.: WO90/14928
PCT Pub. Date: Dec. 13, 1990

[30] Foreign Application Priority Data
Jun. 1, 1989 [GB] United Kingdom ............. 8912562

[51] Int. Cl.$^5$ ............................................. B25F 1/00
[52] U.S. Cl. ......................................... 33/334; 33/382; 33/390; 7/164
[58] Field of Search .................... 7/146, 164, 143; 81/489; 33/379, 334, 354, 365, 377, 381, 390, 382, 383, 384, 385, 386, 387, 388, 389

[56] References Cited
U.S. PATENT DOCUMENTS

| | | |
|---|---|---|
| 1,702,689 | 2/1929 | Duemler. |
| 2,521,525 | 9/1950 | Krausser .................. 33/375 |
| 2,594,543 | 4/1952 | Douglas .................. 33/375 |
| 2,948,067 | 8/1960 | Mistretta ................. 33/38 |
| 3,119,424 | 1/1964 | Henry. |
| 4,332,046 | 6/1982 | Foley. |
| 4,581,782 | 4/1986 | Riley. |

FOREIGN PATENT DOCUMENTS

| | | |
|---|---|---|
| 59-15810 | 1/1984 | Japan. |
| 58178210 | 1/1984 | Japan. |
| 1473765 | 5/1977 | United Kingdom. |
| 8804405 | 6/1988 | World Int. Prop. O.. |
| 8808115 | 10/1988 | World Int. Prop. O.. |

Primary Examiner—Thomas B. Will
Attorney, Agent, or Firm—Griffin, Butler, Whisenhunt & Kurtossy

[57] ABSTRACT

An angle finding device particularly in the form of a hammer having a circular or part circular spirit level vial (8) provided with a graduated scale mounted in the hammer head (3). A straight spirit level vial (10, 11) may be positioned across a diameter of the circular vial (8) such that its axis lies at an angle α to the axis (A) of the shaft. This combination enables the hammer to be used as an angle finding device and a general levelling device when the striking face (6) of the hammer and the end (5) of the shaft are placed against a work surface (W) to be level tested.

4 Claims, 2 Drawing Sheets

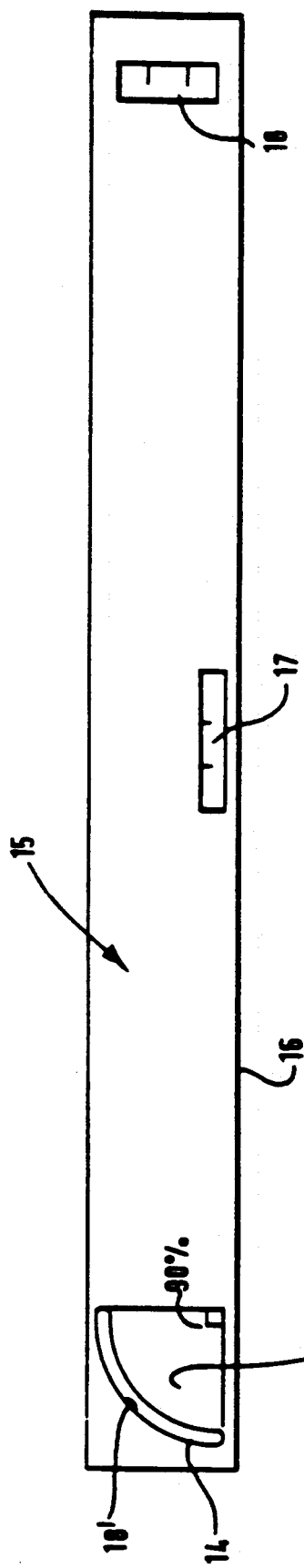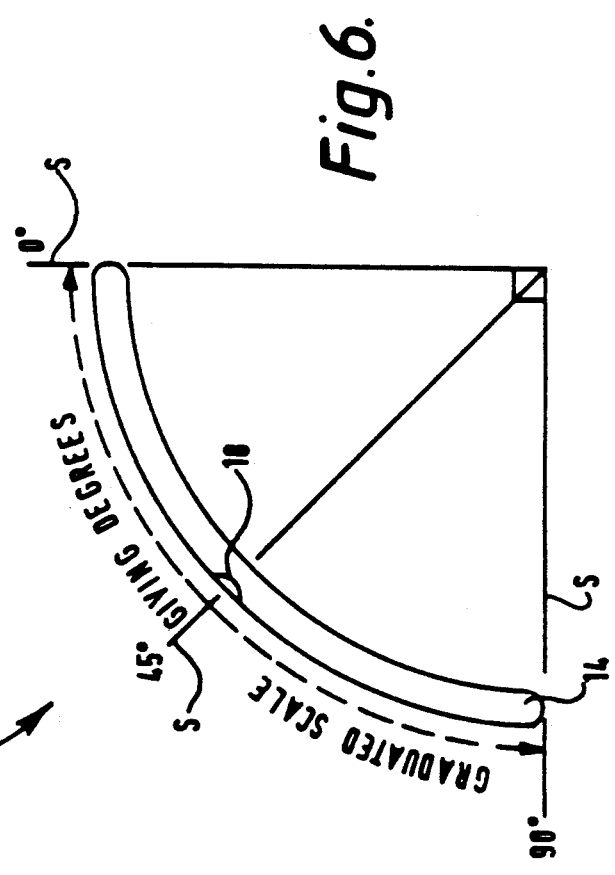
Fig.5.
Fig.6.

ANGLE FINDING DEVICE

FIELD OF THE INVENTION

The present invention relates to an angle finding device and particularly but not exclusively to an angle finding device in the form of a hammer incorporating a spirit level vial whereby for example the hammer can be used to adjust the orientation of a work surface and contemporaneously to check whether that surface is horizontal (or vertical) according to requirements.

BACKGROUND OF THE INVENTION

A combined hammer and levelling device is known in the prior art for example U.S. Pat. No. 1,702,689 and U.S. Pat. No. 3,119,424.

In the former patent a level vial is incorporated in the shaft of a hammer. To enable the hammer to be used as a level, the shaft is held parallel to the workpiece to be level tested by mean of two support points, one being the flat surface of the striking face of the hammer and the other the end of an adjustable support arm attached to the end of the shaft. Consequently the axis of the level vial in the shaft may be arranged such that it is either normal or parallel to a plane containing the end of the support arm when extended and the flat striking face of the hammer, i.e. the plane of the workpiece.

The disadvantage of this design lies in the incorporation of the support arm on the end of the shaft which has to be swung between two positions as between when the device is being used as a hammer and when as a level. This imposes a necessary interference factor on the operator, and time is wasted in switching from one function to another.

SUMMARY OF THE INVENTION

It is an object of the present invention to overcome the disadvantages of the prior art and to provide an angle finding device particularly in the form of an impacting device such as a hammer thus providing a dual purpose implement which does not require to be converted for use in either function.

According to the invention there is provided an angle finding device comprising a body mounting a containment vessel filled with a liquid but including a bubble, the vessel being shaped to provide a path of travel for the bubble therein between successive angular positions thereof corresponding to rotational positions of the body, and scale means provided on or adjacent the vessel for reading the angular position of the bubble and hence of the body.

Preferably the vessel is a circular or part circular hollow ring vial.

The body mounting the vessel may be an ordinary hammer comprising a hammer head with an operating shaft. The peripheral edge of the striking face of the hammer head and the peripheral edge of the end of the shaft are then used as support points for resting against a work surface the orientation of which, normally with respect to the horizontal and vertical, is to be tested.

In a preferred embodiment a circular or part circular ring vial is mounted on the head of the hammer. Two circular ring vials may be provided, one on either side of the hammer head.

Advantageously a straight spirit level vial may be provided across a diameter of the circular vials, the axis of which is arranged at an angle to the axis of the shaft such that a level condition is registered therein corresponding to the desired orientation of the workpiece upon which rests the above support points of the hammer body.

BRIEF DESCRIPTION OF THE DRAWINGS

The invention will now be described by way of example with reference to the accompanied drawings wherein:

FIGS. 5 and 6 illustrate a further embodiment of the invention.

BEST MODES OF CARRYING OUT THE INVENTION

Figure 1:
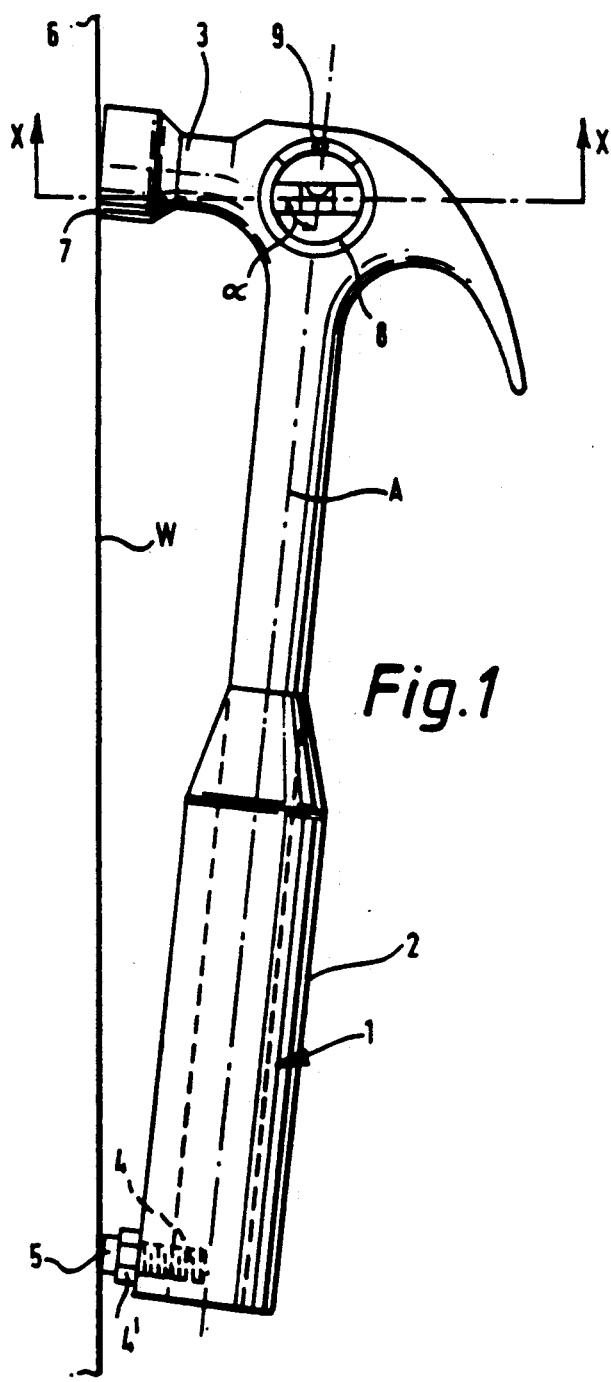
FIG. 1 is a side view of a combined hammer and levelling device is accordance with the invention.

The angle finding device shown in FIG. 1 comprises a hammer having an elongate shaft 1 which is provided with a handle or grip 2, the shaft 1 being formed one piece with the hammer head 3.

The end of the shaft 1 remote from the hammer head 3 is provided with a set screw the shank 4 of which is threaded into the shaft 1 and has a lock nut 5.

In using the device shown in the drawings, the hammer is first placed against a surface W to be tested (being a vertical wall in the example of FIG. 1) with the head 5 of the set screw and with a peripheral edge portion of the striking face 6 of the hammer head 3 held against the surface W. The striking face of the hammer head is slightly chamfered at 7 to lie flat against the surface W.

Figure 3:
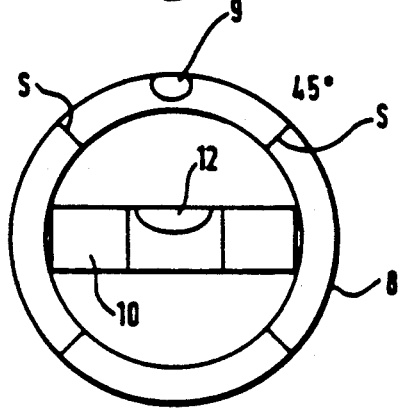
FIG. 3 is an enlarged side view of one side of the hammer head of the device shown in FIG. 1.
Figure 4:
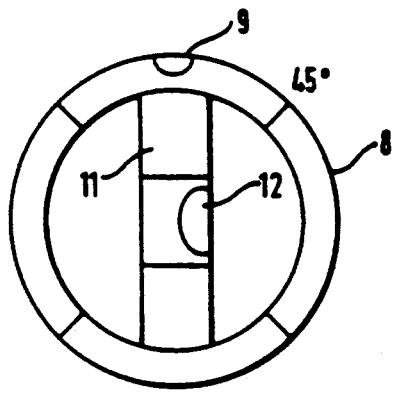
FIG. 4 is a similar view to that of FIG. 3 on the other side of the hammer head.

Each side of the hammer head is provided with an angle finding device, adjacent the junction of the hammer head 3 with the shaft 1. Each of these devices, see more particularly in FIGS. 3 and 4 comprises a circular hollow transparent ring 8 filled with a liquid such as a suitable spirit but having a bubble 9 for example of air or liquid.

Each ring 8 is marked with an arcuate scale S from which the angular position of the bubble 9 can be read which in turn indicates the angular position of the surface against which the hammer is rested with respect to horizontal or vertical as the case may be.

Further across a diameter of each ring 8 is mounted a hollow transparent tube 10,11 filled with spirit but having a bubble 12. One tube 10 lies across the diameter of one circular ring 8 to indicate whether the surface W being tested is vertical, whilst in the other ring 8 the tube 11 is arranged to indicate whether the surface W being tested is horizontal.

To enable the head 5 and chamfered edge 7 to act as support points when the device is being used as a level, the axis of the straight level vial 10 is arranged to be normal to a plane containing these two support points such that it registers a level condition when the surface W is in the desired orientation, that is vertical, and the axis of vial 11 parallel to that plane when the surface W is horizontal.

To achieve this in the configuration shown, the axis of the vial 10 is positioned to be at an angle $\alpha$ to the axis A of the shaft 1 as shown in FIG. 1.

Figure 2:
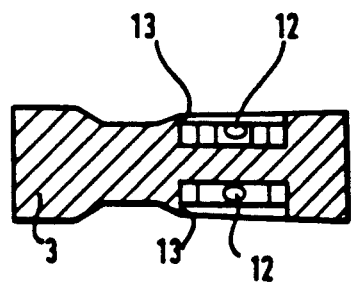
FIG. 2 is a section through the hammer head on the line X—X shown in FIG. 1.

To accommodate the rings 8 and the vials 10 and 11, each side of the hammer head, see FIG. 2, is formed with the circular recess 13 in which the vials are fixed with epoxy resin or other suitable substance.

In use of the hammer as described for level testing the hammer is placed with the head of the set screw 5 and the chamfered edge 7 of the striking face of the hammer head 3, against the surface W.

The levels 10 and 11 on either side of the hammer head will then indicate whether the surface is vertical or horizontal respectively. The angular position of the surface W can also be read from either of the circular angular finding devices 8.

It will be appreciated that the chamfered edge 7 and head 5 are formed for a preferred purpose. It is also feasible merely to use a peripheral edge of the striking face of a standard hammer and a peripheral edge of the end of its shaft as the required support points for level testing.

It will also be appreciated that, whilst a preferred embodiment has been described with respect to a hammer, the angle finding device comprising the circular spirit level rings 8 or at least one of them, may be mounted in any suitable body provided with a datum surface or datum points for placing against a surface the angle of orientation of which, with respect to vertical or horizontal, is to be found.

Such a body may also comprise at least one straight spirit level element for indicating a horizontal or vertical surface. The body may comprise two circular rings in opposite sides and may further comprise a straight level element in one or both such sides preferably one for indicating horizontal and the other vertical. Thus the invention may be embodied as a hammer or other tool, or as a device simply for finding angles and for example incorporated in a standard spirit level.

In this connection a further embodiment of the invention is shown in FIGS. 5 and 6. In this embodiment a quarter circle spirit level vial 14 is mounted at one end of the rectangular block 15, the lower surface 16 of the block forming the datum surface of the angle finding device shown.

Two straight spirit level vials 17 and 18 are mounted in the block 15 for determining the orientation of the datum surface 16 with respect to vertical and horizontal.

The face of the block is inscribed with a graduated scale S, in relation to the angular positions of the bubble 18 in the vial 14 between 0° and 90° corresponding to a horizontal and vertical orientation of the datum surface 16.

Although the embodiment described above with reference to FIGS. 1 to 4 incorporates the use of both a circular and straight spirit level vial only one of these elements would be necessary to provide a hammer with the dual facility required. Furthermore it is not necessary that the non-linear vial be a complete circle. A quarter circle vial mounted in the hammer head would be sufficient as of the type shown in the FIG. 5 and 6 embodiment.

Moreover although only circular and straight spirit level vials have been described in the above preferred embodiments, it may be envisaged that other shapes of containment vessel would be suitable so long as the bubble is allowed to travel in such a way that its positional movement may be used to determine angular position.

I claim:

1. An angle finding device comprising a main hammer body provided with an operating shaft and a hammer head mounted on the shaft near an end thereof, the handle including a gripping means for being gripped by a hand to manipulate a striking face of the hammer head to strike objects therewith, the striking face of the hammer head and an end of the shaft forming support points for resting on a work surface, said angle finding device further comprising a spirit level mounted in said hammer head such that a position of a bubble in said level registers an orientation of the work surface when the support points are resting on the work surface;
wherein said support point at the end of the shaft is in the form of an adjustable set screw, a flat head of which provides said support point.

2. An angle finding device comprising a main hammer body provided with an operating shaft and a hammer head mounted on the shaft near an end thereof, the handle including a gripping means for being gripped by a hand to manipulate a striking face of the hammer head to strike objects therewith, the striking face of the hammer head and an end of the shaft forming support points for resting on a work surface, said angle finding device further comprising a spirit level mounted in said main hammer body such that a position of a bubble in said level registers an orientation of the work surface when the support points are resting on the work surface, wherein said level comprises a substantially circular spirit-level vial and a substantially straight spirit-level vial which is mounted across a diameter of the substantially circular spirit-level vial, an axis of elongation of the substantially straight spirit-level vial being either normal or parallel to a plane containing the two support points.

3. An angle finding device comprising a main hammer body provided with an operating shaft and a hammer head mounted on the shaft near an end thereof, the handle including a gripping means for being gripped by a hand to manipulate a striking face of the hammer head to strike objects therewith, the striking face of the hammer head and an end of the shaft forming support points for resting on a work surface, said angle finding device further comprising a spirit level mounted in said main hammer body such that a position of a bubble in said level registers an orientation of the work surface when the support points are resting on the work surface, wherein a peripheral edge of the striking face of the hammer head has a chamfered portion to provide a flat support surface for forming one of said support points, said flat support surface lying substantially in a plane passing through said support points.

4. An angle finding device comprising a main hammer body provided with an operating shaft and a hammer head mounted on the shaft near an end thereof, the handle including a gripping means for being gripped by a hand to manipulate a striking face of the hammer head to strike objects therewith, the striking face of the hammer head and an end of the shaft forming support points for resting on a work surface, said angle finding device further comprising a spirit level mounted in said hammer head such that a position of a bubble in said level registers an orientation of the work surface when the support points are resting on the work surface;
wherein there is a separate spirit level on each side of the hammer head; and
wherein one of said levels on one side is calibrated to indicate when said support points are in a horizontal orientation and the other of said levels is calibrated to indicate when said support points are in a vertical orientation.

* * * * *